United States Patent [19]

Bystrianyk et al.

[11] E Re. 28,759

[45] Reissued Apr. 6, 1976

[54] MOLTEN GLASS GOB DISTRIBUTION SYSTEM

[75] Inventors: Wasyl Bystrianyk, Hartford; Francis A. Sarkozy, West Hartford, both of Conn.

[73] Assignee: Emhart Corporation, Hartford, Conn.

[22] Filed: Apr. 4, 1974

[21] Appl. No.: 457,761

Related U.S. Patent Documents

Reissue of:

[64] Patent No.: 3,721,544
Issued: Mar. 20, 1973
Appl. No.: 199,458
Filed: Nov. 17, 1971

U.S. Applications:

[63] Continuation of Ser. No. 82,736, Oct. 21, 1970, abandoned, which is a continuation of Ser. No. 1,096, Jan. 7, 1970, abandoned.

[52] U.S. Cl. ..... 65/207; 65/225; 65/304
[51] Int. Cl.[2] ..... C03B 9/00; C03B 5/30
[58] Field of Search ..... 65/304, 225, 207

[56] References Cited

UNITED STATES PATENTS

| | | | |
|---|---|---|---|
| 596,897 | 1/1898 | May | 164/256 |
| 1,331,536 | 2/1920 | Soubier | 65/304 |
| 1,466,367 | 8/1923 | Lorenz | 65/304 X |
| 2,013,463 | 9/1935 | Headley et al. | 65/304 X |
| 3,333,938 | 8/1967 | Zappia | 65/225 |
| 3,552,942 | 1/1971 | Trudeau | 65/304 |
| 3,585,017 | 6/1971 | Trudeau | 65/304 |
| 3,597,187 | 8/1971 | Trudeau | 65/304 |
| R28,073 | 9/1974 | Trudeau | 65/304 |

*Primary Examiner*—S. Leon Bashore
*Assistant Examiner*—Frank W. Miga
*Attorney, Agent, or Firm*—McCormick, Paulding & Huber

[57] ABSTRACT

A system for distributing successively formed groups of glass gobs from a feeder bowl to the several individual sections of a Hartford I.S. type glassware forming machine includes a single scoop for each gob in the group, and mechanism for rotating the scoops between successive positions wherein each is aligned with a chute associated with a particular mold cavity in each machine section. A "double-gob" installation is described and the two scoops have associated annular spur gears which are driven in unison by a reciprocable rack gear through a predetermined schedule of angular displacements to successively align the two scoops with several sets of paired chutes according to a particular order and to then repeat this schedule. A cam follower connected to the rack gear causes programmed movement thereof in response to rotation of a cam having lobes of predetermined height to produce the predetermined schedule of angular displacements of the scoops.

44 Claims, 7 Drawing Figures

INVENTORS
WASYL BYSTRIANYK
FRANCIS A. SARKOZY

BY
McCormick, Paulding & Huber
ATTORNEYS

INVENTORS
WASYL BYSTRIANYK
FRANCIS A. SARKOZY
BY
McCormick, Paulding & Huber

MOLTEN GLASS GOB DISTRIBUTION SYSTEM

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation application Ser. No. 82,736 entitled Molten Glass Gob Distribution System, filed Oct. 21, 1970, now abandoned, which application is in turn a continuation application of Ser. No. 1,096 entitled Molten Glass Gob Distribution System, filed Jan. 7, 1970, now abandoned, all applications being in the names of Wasyl Bystrianyk and Francis A. Sarkozy.

In a typical glassware production facility, the machine for molding the molten glass generally comprises several individual sections, and each section includes a mold assembly of single, double or triple cavity design. All of these machine sections are generally supplied with molten glass gobs, or charges, from a single feeder bowl and forehearth installation. The feeder bowl has an outlet wherein groups of glass gobs are successively formed to fill the single, double or triple gob mold cavity design of the sections.

Chutes are generally provided to direct the successively formed groups of glass gobs to the several machine sections, and each group of such chutes has an upper end which is located in spaced relationship to the outlet of the feeder bowl. Heretofore the scoops have usually been reciprocated from and to active positions beneath the feeder bowl to direct the newly formed gobs to the appropriate chutes, each group of scoops being moved in its proper sequence to direct the gobs of molten glass into their associated chute. For example, in an eight-section machine equipped with double gob mold assemblies some sixteen scoops must be actuated by eight separate fluid motors.

A principal object of the present invention is to provide a single mechanism for accomplishing this glass gob distribution function wherein successively formed groups of glass gobs are sequentially fed into chutes associated with a multi-cavity multiple section glassware forming machine.

Another object of the present invention is to provide a single mechanism of the foregoing character wherein means is provided for deflecting any of the successively formed groups of glass gobs into a cullet chute or the like to prevent damage by molten glass during power plant failure, or while a machine is shut down.

Still another object of the present invention is to provide in a single mechanism of the foregoing character means for swinging said mechanism horizontally out from under the feeder bowl outlet so as to permit replacement of orifice rings, and minor maintenance to be accomplished in the area of the mechanism for shearing the gobs as these gobs drop downwardly from the feeder bowl outlet.

This invention relates generally to systems for delivering molten glass gobs or charges to the mold cavities of a glassware forming machine, and deals more particularly with a molten glass gob distribution system wherein a single group of scoops is manipulated so as to sequentially distribute the groups of glass gobs as they are formed at the outlet spout of a feeder bowl into a plurality of fixed chutes associated with each of the cavities and sections of a typical Hartford I.S. type glassware forming machine.

In its presently preferred form the present invention contemplates a plurality of fixed chutes arranged in groups in a circular fashion adjacent the outlet spout of a feeder bowl, each chute being associated with a particular mold cavity, and each group of chutes being associated with a particular section in the glassware forming machine. The mechanism of the present invention includes an arcuate scoop for each gob in the group, being formed at the feeder bowl rather than for each of the chutes associated with each of the cavities in the mold assemblies of the various machine sections. In the double gob installation described herein two such scoops are utilized, and the mechanism of the present invention supports the two scoops in depending relationship, and for rotation on individual vertically oriented scoop axes. This mechanism rotates these scoops simultaneously and through mutually equal angular displacements, and includes control means for varying these angular displacements in accordance with a predetermined schedule whereby the scoops are cyclically aligned with each of said groups of chutes to provide groups of glass gobs to all of the individual machine sections.

Figure 1:
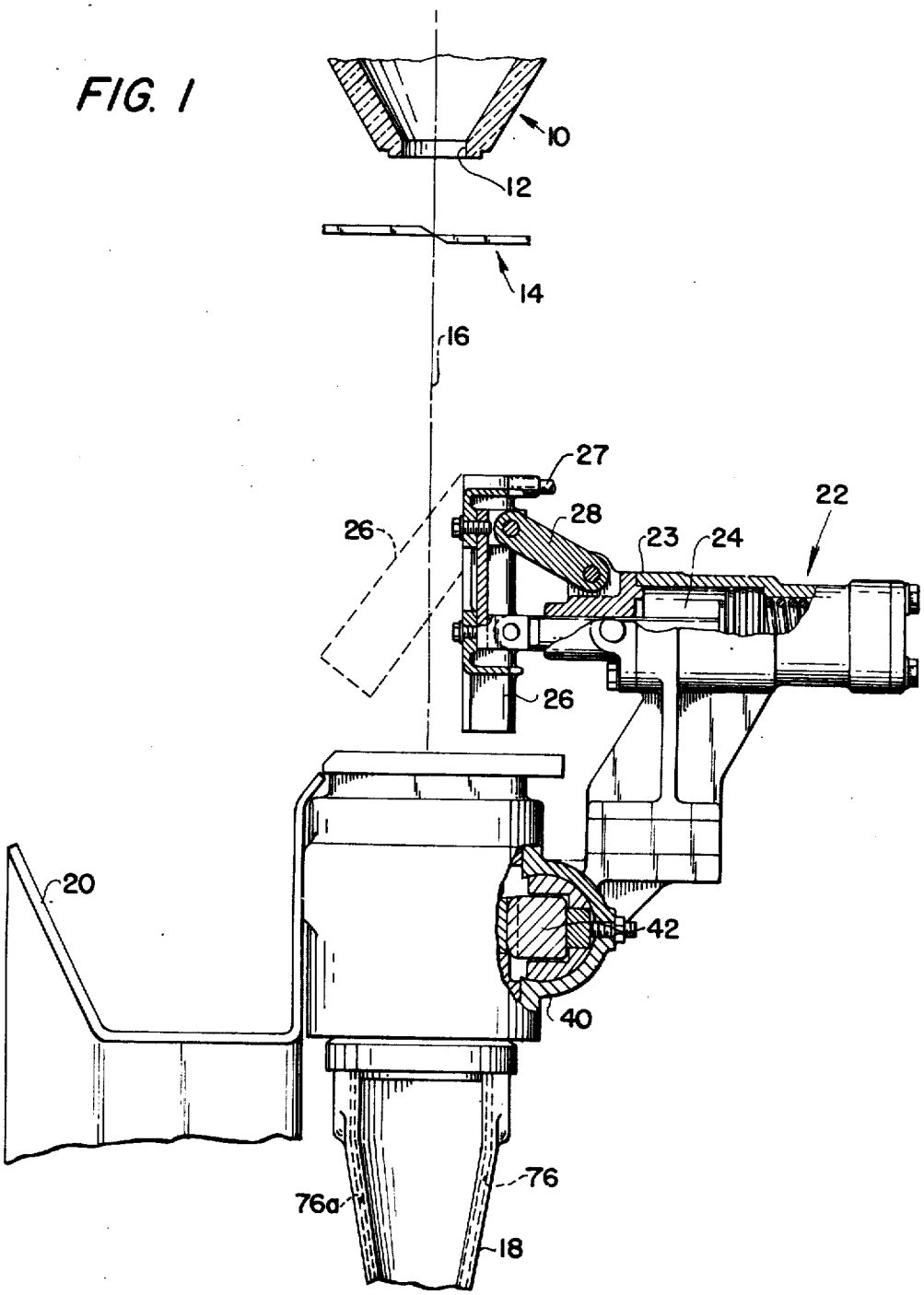
FIG. 1 is an elevational view partly in vertical section showing the mechanism of the present invention and its relationship to the outlet spout of a feeder bowl and its associated shear blades, the latter components being shown in schematic fashion.

Turning now to the drawings in greater detail, FIG. 1 shows in schematic fashion the outlet spout of a typical feeder bowl 10. A gob forming mechanism (not shown) of conventional configuration is provided in the feeder bowl to form gobs of molten glass in a well known manner for use in the various sections of a glassware forming machine. The feeder bowl spout is more particularly defined by a double gob orifice plate 12, only one of the openings in which are shown in FIG. 1. A glass gob shear mechanism, indicated schematically at 14 is provided below the feeder bowl 10 to sever the glass gob charges emanating from the orifice 12 in a well known manner. The glass gob itself will fall downwardly along the line 16 through a funnel portion of the mechanism to be described and thence downwardly through a scoop 18 into one of several chutes shown best in FIG. 2, for deliverey to the appropriate cavity in the appropriate section of the glassware forming ma- ıine. In the event that a particular machine section is be shut down for any reason, and hence cannot :cept one or more of these gobs, means is provided for :flecting the glass gob to one side and for carrying id gob away in a cullet chute 20. As shown in FIG. 1 id glass gob deflecting means comprises a fluid motor ! with a reciprocable part 24 in the form of a piston ıd actuating rod. The rod extends through the end ›rtion of the cylinder and is pivotally connected to a :flector 26. The deflector 26 comprises a chute-like ember with means for water cooling 27, one such :flector is provided for each of the glass gobs being rmed at the outlet spout of the feeder bowl, and each :flector 26 is connected at its upper end to a fixed ırt 23 of the fluid motor 22 by means of a link 28 as own. As so constructed and arranged extension of e reciprocable part 24 of the fluid motor 22 causes e deflector 26 to move from the solid line position own to the broken line position shown. In the broken ıe position a glass gob dropping downwardly from the ıtlet spout of the feeder bowl will be deflected later- ly into the cullet chute 20. In the solid line position own the gob is of course allowed to drop straight ›wn, through the funnel mechanism to be described, ıd into the scoop 18.

Figure 2:
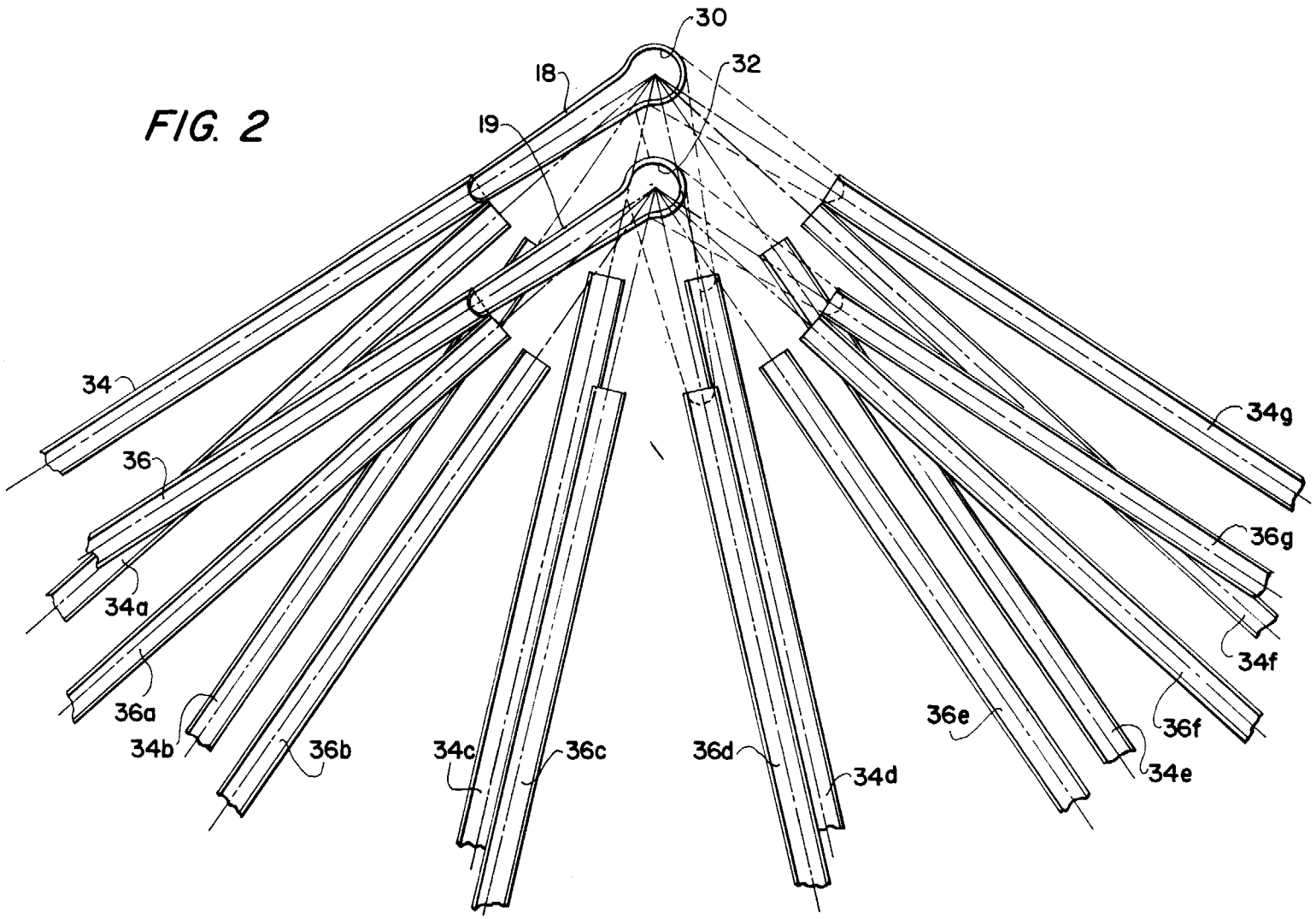
FIG. 2 is a schematic plan view of a pair of scoops in several of a variety of positions corresponding to the plurality of chutes associated with the various individual sections of a typical Hartford I.S. glassware forming machine, the mechanism for so moving these scoops being omitted for clarity.

As best shown in FIG. 2 the mechanism to be de- ribed is adapted for use in a double gob type glass- are forming machine, two glass gobs being capable of ıssing through upper funnel portions 30 and 32 of the oops 18 and 19 respectively. In the positions shown full lines for the scoops 18 and 19 these glass gob ıarges are directed laterally to the left and into the ked chutes 34 and 36 respectively. The group of fixed ıutes 34 and 36 is associated with a single section in ıe glassware forming machine (not shown) and other 'oups of chutes are provided as indicated generally at 4 and 36 subscripts a–g inclusively. The mechanism of ıe present invention is adapted to rotate the scoops 18 ıd 19 from the full line position shown in FIG. 2 to :her positions wherein said scops are aligned with the ked chutes 34a, 36a through 34g, 36g inclusively in :cordance with a predetermined schedule.

Figure 3:
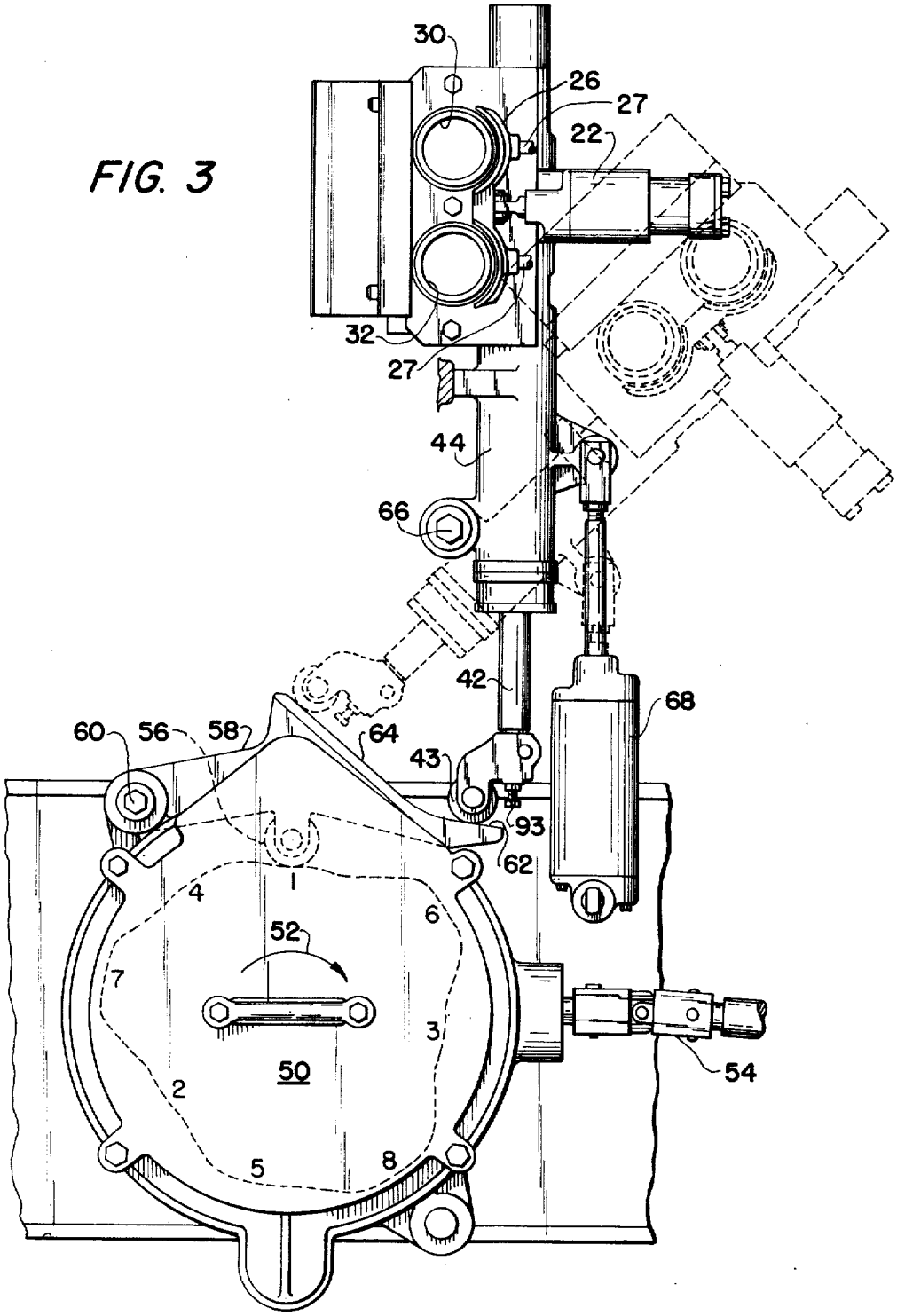
FIG. 3 is a plan view of the mechanism shown in FIG. 1, said mechanism being shown in its active position in full lines and in its inactive position in broken lines.
Figure 4:
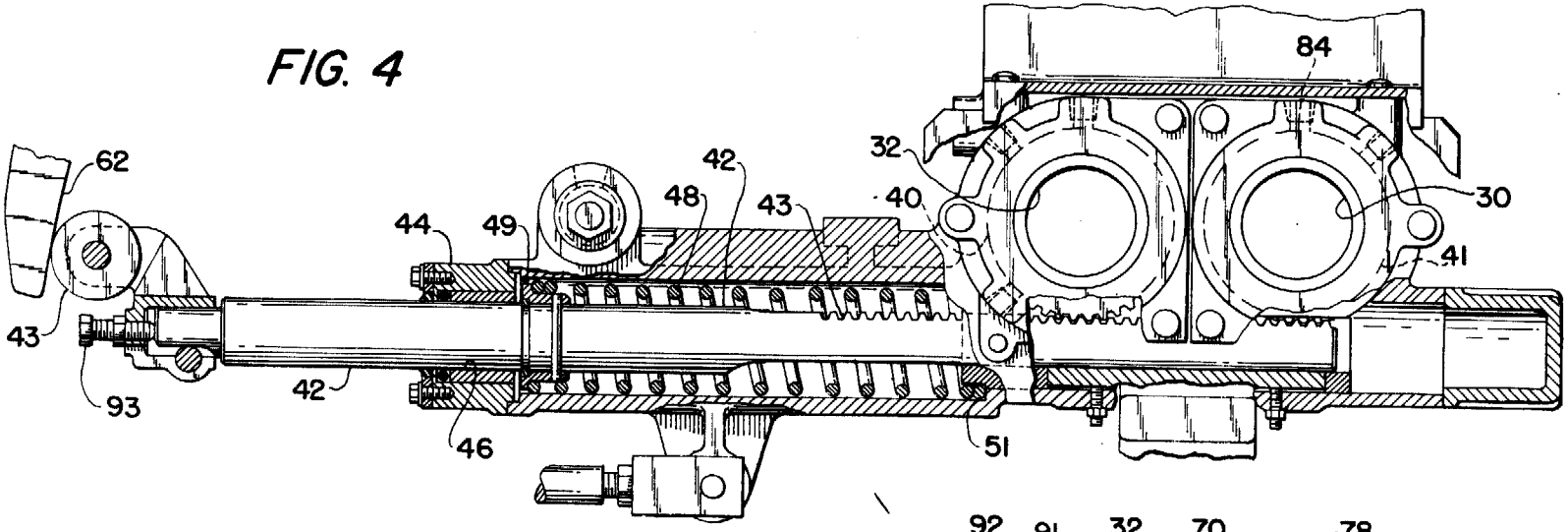
FIG. 4 is a horizontal sectional view through a portion of the mechanism shown in FIG. 3.
Figure 5:
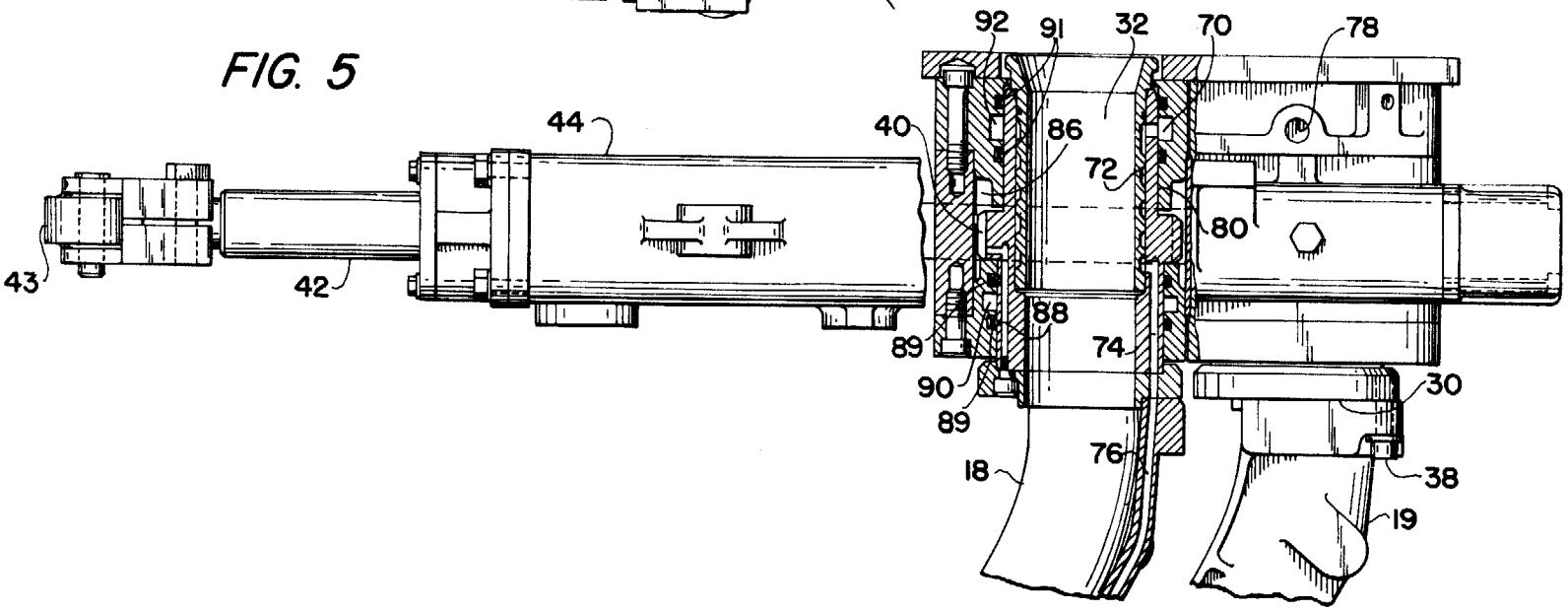
FIG. 5 is an elevational view, partly in section, through the mechanism of FIG. 4.

FIG. 3 shows the mechanism of the present invention ı plan view with the circular pattern of fixed chutes ıown in FIG. 2 eliminated for the sake of clarity. FIG. also shows the programmed means for accomplish- ıg, sequentially, the predetermined angular displace- ıents of the scoop means 18 and 19. The position ıown for the double scoop in FIG. 3 corresponds to ıat depicted in FIG. 2, that is, these scoops are aligned ith the chutes 34 and 36. FIGS. 4 and 5 show in detail ıe portion of the mechanism of FIG. 3 for imparting ›tational movement to the upper end portions of the :oops 18 and 19.

Turning now to a more complete description of the ıechanism for so supporting the depending scoops 18 nd 19, FIG. 5 shows the scoop 18 as having an upper ınnel portion 32 which is of tubular shape and com- ıunicates at its lower end with the upper end of the rcuate portion of the scoop 18. As shown at 38 the ther scoop 19 is in fact supported from its associated ıbular portion 30 by means of a screw. The tubular ortion 32 of the scoop 18 carries an annular spur gear 0 approximately midway between its upper and lower nds, which spur gear meshes with a rack gear defining ortion 43 of an elongated member 42. The member 42 ı slidably supported in a generally tubular housing /hich includes an opening 46 at its left hand end portion through which the elongated member 42 extends as best shown in FIG. 4. Still with reference to FIG. 4 the rack gear defining portion 43 of the elongated member 42 also meshes with a similar gear 41 located on the tubular portion 30 associated with the other scoop 19 with the result that both scoops 18 and 19 are adapted to being rotated in unison with one another and through mutually equal angles in response to linear reciprocable movement of the elongated member 42. For example, movement of the member 42 toward the right in FIG. 4, so as to achieve counterclockwise rotational movement of the scoop means, is accomplished through a rotary cam to be described acting through the member 62, whereas return movement of the member 42 is achieved by biasing means in the form of a coiled compression spring 48 provided in the enclosed housing 44 and acting against an annular stop ring 49 provided for this purpose on the member 42 and against a spring receiving receptacle, indicated generally at 51 defined in the housing 44.

As best shown in FIG. 3, control means is provided for rotating said scoop means successively through varying angular displacements. Said control means preferably comprises a rotary cam 50 which is driven in the direction of the arrow 52 through a drive means 54 operating in timed relationship with the glassware forming machine. The rotary cam 50 has a plurality of lobes, indicated generally by the reference numerals 1 through 8 inclusively, and a cam follower 56 is provided on a cam follower lever 58 mounted for pivotal movement about the fixed axis of the rock shaft 60 in response to passing of each of the lobes by the cam follower 56. The rotary cam 50 and cam follower 56 are partially immersed in oil. A ramp surface is also defined on the cam follower lever 58 and includes an active portion 62 against which the adjacent end portion 43 of the reciprocating member 42 is adapted to abut during normal operation as shown in full lines in FIG. 3. The end portion 43 is adjustable by means of screw 93 which is used to align scoops 18 and 19 with chutes 34 and 36. As so constructed and arranged pivotal movement of the cam follower lever 58 will be seen to cause the linear movement of the member 42 referred to hereinabove, thereby causing equal angular rotational movement of the scoops 18 and 19 in accordance with a predetermined schedule dictated by the particular shape of the rotary cam 50.

In further accordance with the present invention the ramp surface of the cam follower lever 58 is also included in an inactive portion 64 which is adapted to abut said one end 43 of the reciprocating member 42 as the latter is swung from the solid line position shown in FIG. 3 to the broken line position shown. This end 43 preferably comprises a cam follower roller to facilitate this motion. Thus, the mechanism, including the scoops 18 and 19 can be swung out of the active position shown in full lines to an inactive position shown in broken lines to permit workmen to accomplish minor maintenance to the shear mechanism, indicated generally at 14 in FIG. 1. The housing 44 for the reciprocable elongated member 42 defines the pivot axis 66 about which the mechanism can be so swung, and a fluid air motor 68 is provided for accomplishing this movement. The inactive portion 64 of the ramp surface on the cam follower lever 58 is so shaped that movement of the member 42 about the pivot axis 66 also causes linear displacement of the member 42, and corresponding angular displacement of the scoops 18 and 19, so that the latter are simultaneously swung to inactive positions as shown in FIG. 3 when the housing 44 is swung to its inactive position. Thus, the scoops 18 and 19 are automatically moved away from the feeder bowl outlet spout to a predetermined position well clear of the shears 14 to permit the workman adequate space for accomplishing his task in this area of the overall installation.

Considering next the means shown in FIG. 5 for cooling both the funnel portion 32 of the scoop means and also its arcuate portion 18, it is an important feature of the present invention that a coolant passageway of spiral configuration is provided in this funnel portion 32 so as to prevent excessive heat build-up in the scoop during use. It will be recalled that the two scoops are adapted for continuous use in feeding glass gobs to a plurality of chutes for an entire glassware forming machine, thereby replacing the large number of intermittently used pairs of scoops as in prior art installations as required heretofore for feeding glass gobs to the individual sections of such a machine. As a result of the continuous use to which the single pair of scoops is put, a liquid coolant is preferably circulated through the passageway, indicated generally at 70, 72, 74 and 76 in FIG. 5. The liquid coolant currently used is water at the temperature available from a tap, and is introduced through an inlet port, as for example the port 78 shown in FIG. 5, and into the annular passageway 70, thence through the collar 80 in which the annular gear 40 is defined, into the spirally shaped groove 72 in the inner portion of the tubular funnel 32, and thence downwardly and outwardly through the vertical passageway 74 into an aligned passageway 76 defined in the arcuate scoop portion 18. In its presently preferred form the passageway 76 is provided on one side of the arcuate scoop 18, a similar return passageway (not shown) being provided on the opposite side for carrying the water upwardly through return passageways (not shown) and through the outlet 84 best shown in FIG. 4 with reference to the other scoop 19 and funnel 30.

In further accordance with the present invention means is provided for lubricating the annular gears 40 and 41, and the associated rack gear defining portion 43 of the reciprocating member 42. Preferably, said means comprises providing an oil bath in the hollow interior of the housing portion 44, including that portion of the housing 40 occupied by the coil compression spring 48. The internal portion of the housing 44 thus defines a chamber, part of which is indicated generally at 86 in FIG. 5, and from this view it will be apparent that an internal vertical passageway 88 communicates with the annular passageway 86 for providing lubrication to bearings 89, 89 associated with the lower end of the tubular funnel portion of the scoop means 18. The upper end of the tubular funnel portion 32 also receives lubrication from a similar vertical passageway (not shown) to provide lubrication to the upper bearings 91, 91.

Figure 6:
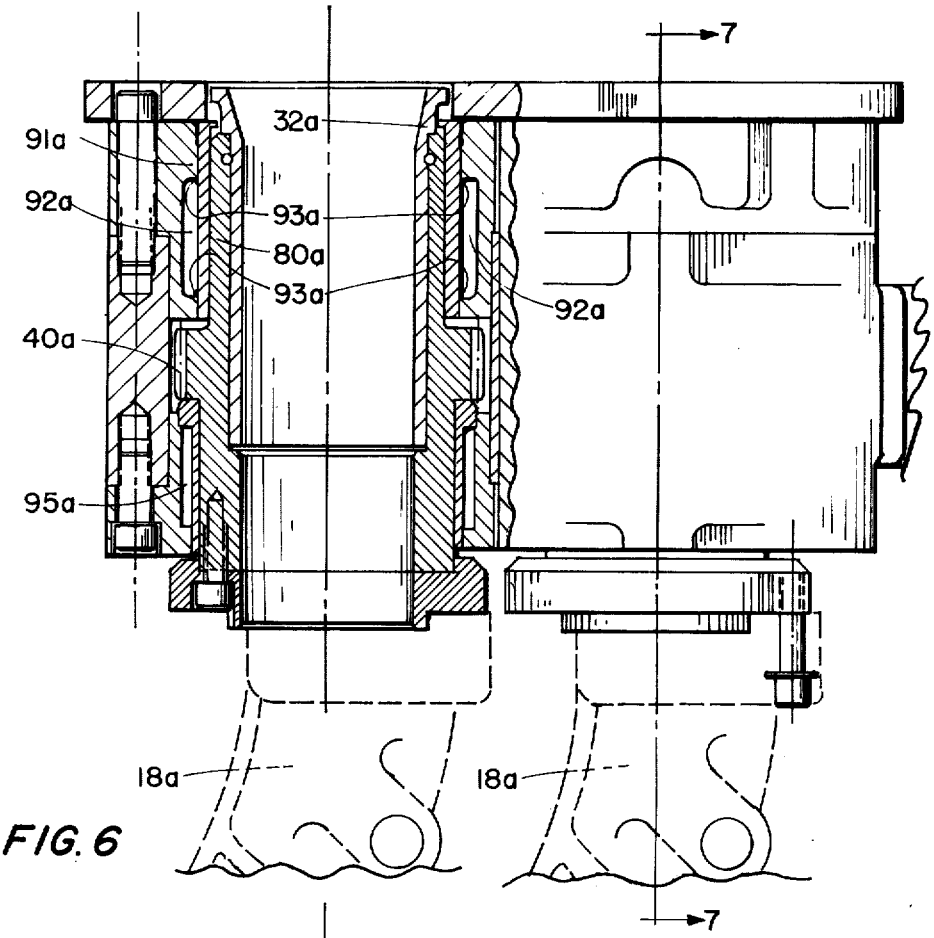
FIG. 6 is a view similar to FIG. 5 but shows a slightly different embodiment thereof.
Figure 7:
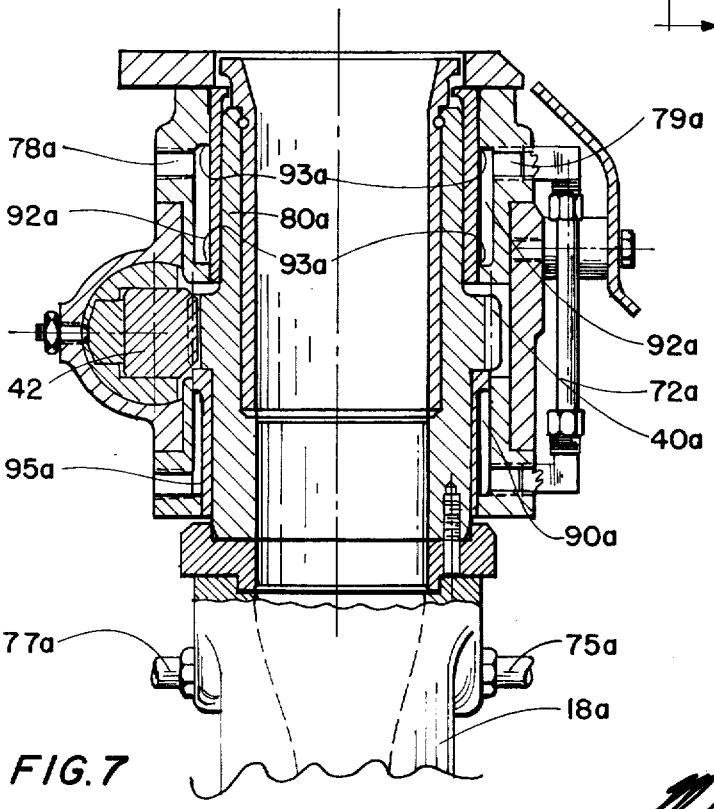
FIG. 7 is a view of the FIG. 6 mechanism taken on the line 7—7 of FIG. 6.

FIGS. 6 and 7 show alternative means for cooling the funnel portion 32a and arcuate portion 18a of a scoop means similar to the scoop means shown and described hereinabove with respect to FIGS. 1–5 inclusively. As in the previously described embodiment two scoops are used in feeding glass gobs to a plurality of chutes for a multisection glassware forming machine. Therefore, the scoop means must be effectively cooled to prevent excessive heat build-up at this juncture of the path of travel of the moletn glass gobs.

A liquid coolant, such as water, is introduced through a side port 78a to an annular chamber 92a, not defined by the collar 80a, which collar defines the gear 40a as in the previous embodiment, but defined instead by a welded, or brazed jacket member 91a. This annular jacket is made up from at least two parts, one of which is a sleeve which rotatably receives the collar 80a. The other of said two jacket parts comprises an annular member with a relieved inner face which mates with the sleeve part and is welded or brazed thereto as shown at 93a, 93a. Thus, the jacket parts define the chamber 92a and an outlet port 79a carries the liquid coolant to a similarly defined chamber 90a at the lower portion of the funnel 32a. As in the previously described embodiment of FIG. 5, the lower portion of the funnel is defined by the collar 80a, but instead of providing coolant at the outer surface of said collar a jacket sleeve or bushing 95a, rotatably receives said collar and an outer jacket part is welded to the sleeve as shown at 93a to define the annular chamber 90a. This chamber 90a communicates with the chamber 92a, described hereinabove, by means of a connecting conduit 72a.

Finally, and still with reference to FIGS. 6 and 7, the arcuate lower portion 18a of the alternative scoop means is also water cooled by means of an internal passageway (not shown), but instead of providing an internal connecting part 76 to the funnel as in the previous embodiment, water is fed from a source directly to the scoop through an inlet port 75a downwardly through said internal passageway on one side of each scoop, and thence upwardly through a passageway on the opposite side to an outlet 77a.

The above described alternative embodiment offers several advantages over the original embodiment shown in FIG. 5. As in the FIG. 5 embodiment, the gear 40a of FIGS. 6 and 7 is preferably immersed in oil. The original construction of FIG. 5 can be seen to rely upon bearings 89 and 91 for rotatably supporting the collar 80. These bearings have tended to deteriorate due to contact with the liquid coolant and as a result of this defect the alternative construction offers an effective seal between the water passageways and the bushings or sleeves as shown at 95a. Only oil can now find its way into the sleeves or bushings now used to rotatably support the collar 80a.

We claim:

1. In a molten glass distribution system for conveying successively formed groups of glass gobs from the outlet of a feeder bowl to each of several groups of fixed chutes, said chute groups being arranged in a circular pattern around said feeder bowl for conveying the groups of glass gobs to the several individual sections of a multi-gob glassware forming machine, the improvement comprising an arcuate scoop for each gob in the group being formed at said feeder bowl outlet, a mechanism for supporting said scoops in depending relationship for rotation on individual vertically oriented scoop axes, said mechanism including means for rotating all of said scoops simultaneously and through mutually related angular displacements, mechanical control means for said scoop rotating means for successively varying these angular displacements whereby said scoops are cyclically aligned with each of said chute groups to provide groups of glass gobs to all of the individual machine sections, a housing for said mechanism, said housing supporting said scoops so that their respective axes of rotation are arranged in side-by-side relationship, said means for rotating said scoops including an annular spur gear circumscribing the upper end of each scoop, a horizontally extending member slidably supported in said housing and having a portion which defines a rack gear for meshing with said spur gears on said scoops to rotate the scoops, and said mechanical control means including means for reciprocating said member from and to successive linear positions.

2. The combination defined in claim 1 wherein said mechanical control means comprises a rotary cam with several lobes, each of which has a predetermined rise, and a cam follower connected to said reciprocating member.

3. The combination defined in claim 2 further characterized by means connecting said cam follower to said reciprocating member, said means comprising a lever mounted on a fixed axis parallel to the axis of rotation of said cam and said cam follower carried by said lever, a ramp surface on said lever including an active portion against which one end of said reciprocating member is normally adapted to abut, and means for pivotally supporting said housing for limited movement on an axis parallel said cam axis of rotation to permit said housing to be swung out of its active position wherein said scoops are adapted to receive glass gobs from said feeder bowl outlet into an inactive position wherein said housing is not located below the feeder bowl outlet, said ramp surface on said lever including an inactive portion which abuts said one end of said reciprocating member to cause linear movement of said reciprocating member and hence angular displacement of said scoops to inactive positions as said housing is so moved.

4. The combination defined in claim 2 further characterized by a glass cullet chute mounted on said housing for carrying away molten glass gobs not dropped into the upper ends of said scoops, and glass gob deflecting means mounted on said housing for selectively deflecting groups of the newly formed gobs of glass into said cullet chute.

5. The combination defined in claim 4 wherein said glass gob deflecting means comprises a fluid motor with a reciprocable part and a fixed part on said housing, a deflector for each gob in said group connected to said reciprocable motor part.

6. The combination defined in claim 2 wherein each scoop includes an upper *tubular* funnel portion [ which carries said annular spur gear and which is of generally tubular shape with a lower end which communicates with the arcuate portion of said scoop and supports said arcuate portion in depending relationship ] *and a lower arcuate portion communicating therewith and supported thereby*, and said tubular funnel portion defining a passageway in and around the sidewall thereof, through which passageway a liquid coolant can be circulated to prevent excessive heat build-up in said scoop funnel portions.

7. The combination defined in claim 3 and further characterized by a fluid motor with a fixed part and a reciprocable part connected to said housing for swinging said housing from and to said active position.

8. The combination defined in claim 2 wherein each scoop includes an upper *tubular* funnel portion [ which carries said annular spur gear and which is of generally tubular shape with a lower end which communicates with the arcuate portion of said scoop to support the latter in depending relationship ] *and a lower arcuate portion communicating therewith and supported thereby*, bearings in said housing for rotatably supporting said tubular funnel portions, and said housing defining internal passageways through which a liquid lubricant can be circulated to provide lubrication and cooling to said bearings and also to said annular gears and said rack gear portion of said reciprocating member.

9. The combination defined in claim 2 wherein a compression spring is provided in said housing adjacent said reciprcating member to bias said member in one direction to urge said cam follower into engagement with said rotary cam.

10. The combination defined in claim 6 wherein the arcuate portions of said scoops also define liquid coolant passageways, said passageways in each of said scoops communicating with said liquid coolant passageway in said funnel portion so that liquid coolant can be circulated through said arcuate scoop portions as well as said funnel scoop portions.

11. The combination defined in claim 8 wherein said housing includes an enclosed portion for a portion of said reciprocating member adjacent its rack defining portion, biasing means in said enclosed housing portion for urging said member in one direction to maintain said cam follower in contact with said rotary cam.

12. The combination defined in claim 11 wherein said housing defines liquid lubricant passageways through which said lubricant circulates to and from said enclosed housing portion, said biasing means comprises a coiled compression spring surrounding said reciprocating member in said enclosed housing portion.

13. The combination defined in claim 2 wherein said scoop includes an upper *tubular* funnel portion [ which carries said spur gear and which is of generally tubular shape with a lower end which communicates with the arcuate portion of said scoops and supports said arcuate portion in depending relationship ] *and a lower arcuate portion communicating therewith and supported thereby*, and jacket means defining at least one liquid coolant passageway outside said tubular funnel portion, said jacket means including an inner portion which defines a bushing for rotatably receiving said tubular funnel portion.

14. The combination defined in claim 13 wherein two such jacket means are provided one above and one below said gear defining portion of said tubular funnel portion, both said jacket means including inner bushing portions for rotatably receiving said funnel portion.

15. The combination defined in claim 14 wherein said arcuate portions of said scoops also define liquid coolant passageways, said liquid coolant being circulated through all of said passageways through external piping.

16. In a molten glass distribution system for conveying successively formed glass gobs from the outlet of a feeder bowl to fixed chutes, said chutes being arranged in a circular pattern around said feeder bowl for conveying the glass gobs to the several individual sections of a glassware forming machine, the improvements comprising at least one arcuate scoop for receiving the gobs being formed at said feeder bowl outlet, a mechanism for supporting said scoop in depending relationship for rotation on a vertically oriented scoop axis, said mechanism including means for rotating said scoop through a range of angular displacements, mechanical control means for said scoop rotating means for successively varying said angular displacement whereby said scoop is cyclically aligned with each of said chutes to provide glass gobs to all of the individual machine sections, a housing for said mechanism, said housing supporting said scoop so that its axis of rotation is arranged vertically, said means for rotating said scoop including an annular spur gear circumscribing the upper end of said scoop, a horizontally extending member slidably supported in said housing and having a portion which defines a rack gear for meshing with said spur gear on said scoop to rotate the scoop, and mechanical control means including means for reciprocating said member from and to successive linear positions.

17. The combination defined in claim 16 wherein said mechanical control means comprises a rotary cam with several lobes, each of which has a predetermined rise, and a cam follower connected to said reciprocating member.

18. The combination defined in claim 17 further characterized by means connecting said cam follower to said reciprocating member, said means comprising a lever mounted on a fixed axis parallel the axis of rotation of said cam and said cam follower carried by said lever, a ramp surface on said lever including an active portion against which one end of said reciprocating member is normally adapted to abut, and means for pivotally supporting said housing for limited movement on an axis parallel said cam axis of rotation to permit said housing to be swung out of its active position wherein said scoop is adapted to receive glass gobs from said feeder bowl outlet into an inactive position wherein said housing is not located below the feeder bowl outlet, said ramp surface on said lever including an inactive portion which abuts said one end of said reciprocating member to cause linear movement of said reciprocating member and hence angular displacement of said scoop to inactive position as said housing is so moved.

19. The combination defined in claim 17 further characterized by a glass cullet chute mounted on said housing for carrying away molten glass gobs not dropped into the upper ends of said scoops, and glass gob deflecting means mounted on said housing for selectively deflecting certain of the newly formed gobs of glass into said cullet chute.

20. The combination defined in claim 19 wherein said glass gob deflecting means comprises a fluid motor with a reciprocable part and a fixed part on said housing a deflector connected to said reciprocable motor part.

21. The combination defined in claim 17 wherein each scoop includes an upper *tubular* funnel portion [ which carries said annular spur gear and which is of generally tubular shape with a lower end which communicates with the arcuate portion of said scoop and supports said arcuate portion in depending relationship] *and a lower arcuate portion communicating therewith and supported thereby*, and said tubular funnel portion defining a passageway in and around the sidewall thereof, through which passageway a liquid coolant can be circulated to prevent excessive heat build-up in said scoop funnel portion.

22. The combination defined in claim 18 and further characterized by a fluid motor with a fixed part and a reciprocable part connected to said housing for swinging said housing from and to said active position.

23. The combination defined in claim 17 wherein said scoop includes an upper *tubular* funnel portion [ which carries said annular spur gear and which is of generally tubular shape with a lower end which communicates with the arcuate portion of said scoop to support the latter in depending relationship] *and a lower arcuate portion communicating therewith and supported thereby*, bearings in said housing for rotatably supporting said tubular funnel portions, and said housing defining internal passageways through which a liquid lubricant can be circulated to provide lubrication and cooling to said bearings and also to said annular gears and said rack gear portion of said reciprocating member.

24. The combination defined in claim 17 wherein a compression spring is provided in said housing adjacent said reciprocating member to bias said member in one direction to urge said cam follower into engagement with said rotary cam.

25. The combination defined in claim [6] *21* wherein the arcuate portion of said scoop also defines liquid [collant] *coolant* passageways, said passageways in said scoop communicating with said coolant passageway in said funnel portion so that liquid coolant can be circulated through said arcuate scoop [portions] *portion* as well as said funnel scoop [portions] *portion.*

26. The combination defined in claim 23 wherein said housing includes an enclosed portion for a portion of said reciprocating member adjacent its rack defining portion, biasing means in said enclosed housing portion for urging said member in one direction to maintain said cam follower in contact with said rotary cam.

27. The combination defined in claim 26 wherein said housing defines liquid lubricant passageways through which said lubricant circulates to and from said enclosed housing portion, said biasing means comprises a coiled compression spring surrounding said reciprocating member in said enclosed housing portion.

28. The combination defined in claim 17 wherein each scoop includes an upper *tubular* funnel portion [ which carries said spur gear and which is of generally tubular shape with a lower end which communicates with the arcuate portion of said scoop and supports said arcuate portion in depending relationship] *and a lower arcuate portion communicating therewith and supported thereby*, and jacket means defining at least one liquid coolant passageway outside said tubular funnel portion, said jacket means including an inner portion which defines a bushing for rotatably receiving said tubular funnel portion.

29. The combination defined in claim 28 wherein two such jacket means are provided one above and one below said gear defining portion of said tubular funnel portion, both said jacket means including inner bushing portions for rotatably receiving said funnel portion.

30. The combination defined in claim 29 wherein said arcuate portions of said scoop also defines liquid coolant passageways, said liquid coolant being circulated through all of said passageways through external piping.

*31. The combination defined in claim 1 wherein each scoop includes an upper tubular funnel portion and a lower arcuate portion communicating therewith and supported thereby, and said tubular funnel portion defining a passageway in and around the sidewall thereof, through which passageway a liquid coolant can be circu-* ted to prevent excessive heat build-up in said scoop nnel portions.

32. The combination defined in claim 1 wherein each coop includes an upper tubular funnel portion and a wer arcuate portion communicating therewith and pported thereby, bearings in said housing for rotatably pporting said tubular funnel portions, and said housing efining internal passageways through which a liquid bricant can be circulated to provide lubrication and oling to said bearings and also to said annular gears nd said rack gear portion of said reciprocating member.

33. The combination defined in claim 31 wherein the rcuate portions of said scoops also define liquid coolant assageways, said passageways in each of said scoops ommunicating with said coolant passageway in said nnel portion so that liquid coolant can be circulated rough said arcuate scoop portions as well as said funnel coop portions.

34. The combination defined in claim 32 wherein said ousing includes an enclosed portion for a portion of said eciprocating member adjacent its rack defining portion nd said housing defines liquid lubricant passageways hrough which said lubricant circulates to and from said nclosed housing portion.

35. The combination defined in claim 1 wherein each coop includes an upper tubular funnel portion and a ower arcuate portion communicating therewith and upported thereby, and jacket means defining at least one iquid coolant passageway outside said tubular funnel ortion, said jacket means including an inner portion hich defines a bushing for rotatably receiving said tubular funnel portion.

36. The combination defined in claim 35 wherein two uch jacket means are provided one above and one below aid gear defining portion of said tubular funnel portion, oth said jacket means including inner bushing portions or rotatably receiving said funnel portion.

37. The combination defined in claim 36 wherein said rcuate portions of said scoops also define liquid coolant assageways, said liquid coolant being circulated through ll of said passageways through external piping.

38. The combination defined in claim 16 wherein each coop includes an upper tubular funnel portion and a ower arcuate portion communicating therewith and upported thereby, and said tubular funnel portion defining a passageway in and around the sidewall thereof, through which passageway a liquid coolant can be circulated to prevent excessive heat build-up in said scoop funnel portion.

39. The combination defined in claim 16 wherein each scoop includes an upper tubular funnel portion and a lower arcuate portion communicating therewith and supported thereby, bearings in said housing for rotatably supporting said tubular funnel portions, and said housing defining internal passageways through which a liquid lubricant can be circulated to provide lubrication and cooling to said bearings and also to said annular gears and said rack gear portion of said reciprocating member.

40. The combination defined in claim 38 wherein the arcuate portion of said scoop also defines liquid coolant passageways, said passageways in said scoop communicating with said coolant passageway in said funnel portion so that liquid coolant can be circulated through said arcuate scoop portions as well as said funnel scoop portions.

41. The combination defined in claim 39 wherein said housing includes an enclosed portion for a portion of said reciprocating member adjacent its rack defining portion and said housing defines liquid lubricant passageways through which said lubricant circulates to and from said enclosed housing portion.

42. The combination defined in claim 16 wherein each scoop includes an upper tubular funnel portion and a lower arcuate portion communicating therewith and supported thereby, and jacket means defining at least one liquid coolant passageway outside said tubular funnel portion, said jacket means including an inner portion which defines a bushing for rotatably receiving said tubular funnel portion.

43. The combination defined in claim 42 wherein two such jacket means are provided one above and one below said gear defining portion of said tubular funnel portion, both said jacket means including inner bushing portions for rotatably receiving said funnel portion.

44. The combination defined in claim 43 wherein said arcuate portions of said scoop also defines liquid coolant passageways, said liquid coolant being circulated through all of said passageways through external piping.

* * * * *